Feb. 25, 1958 E. R. GRANGER 2,824,371
GNATHOLATORS
Filed July 20, 1956 3 Sheets-Sheet 3
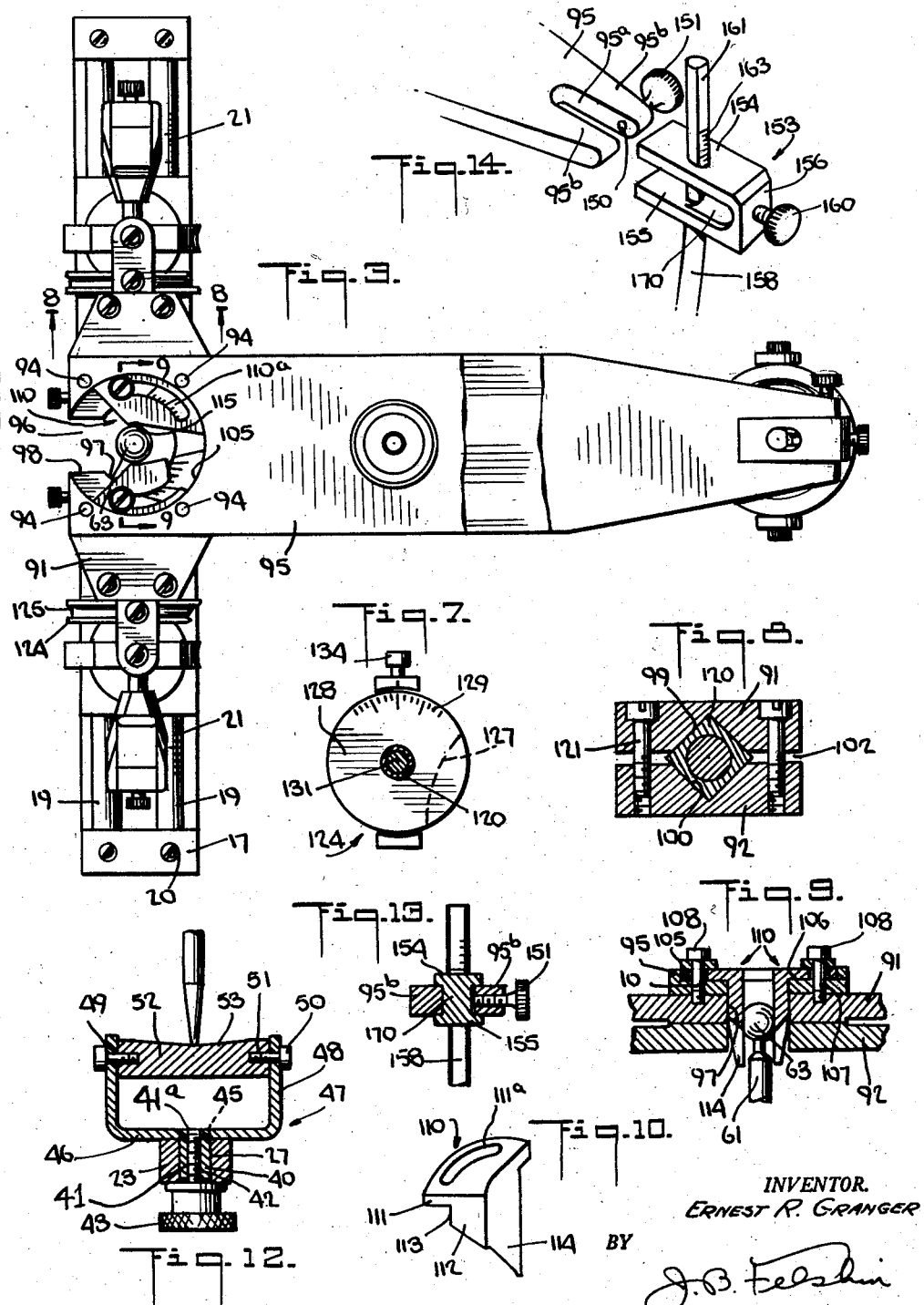
INVENTOR.
ERNEST R. GRANGER
BY
ATTORNEY

United States Patent Office 2,824,371
Patented Feb. 25, 1958

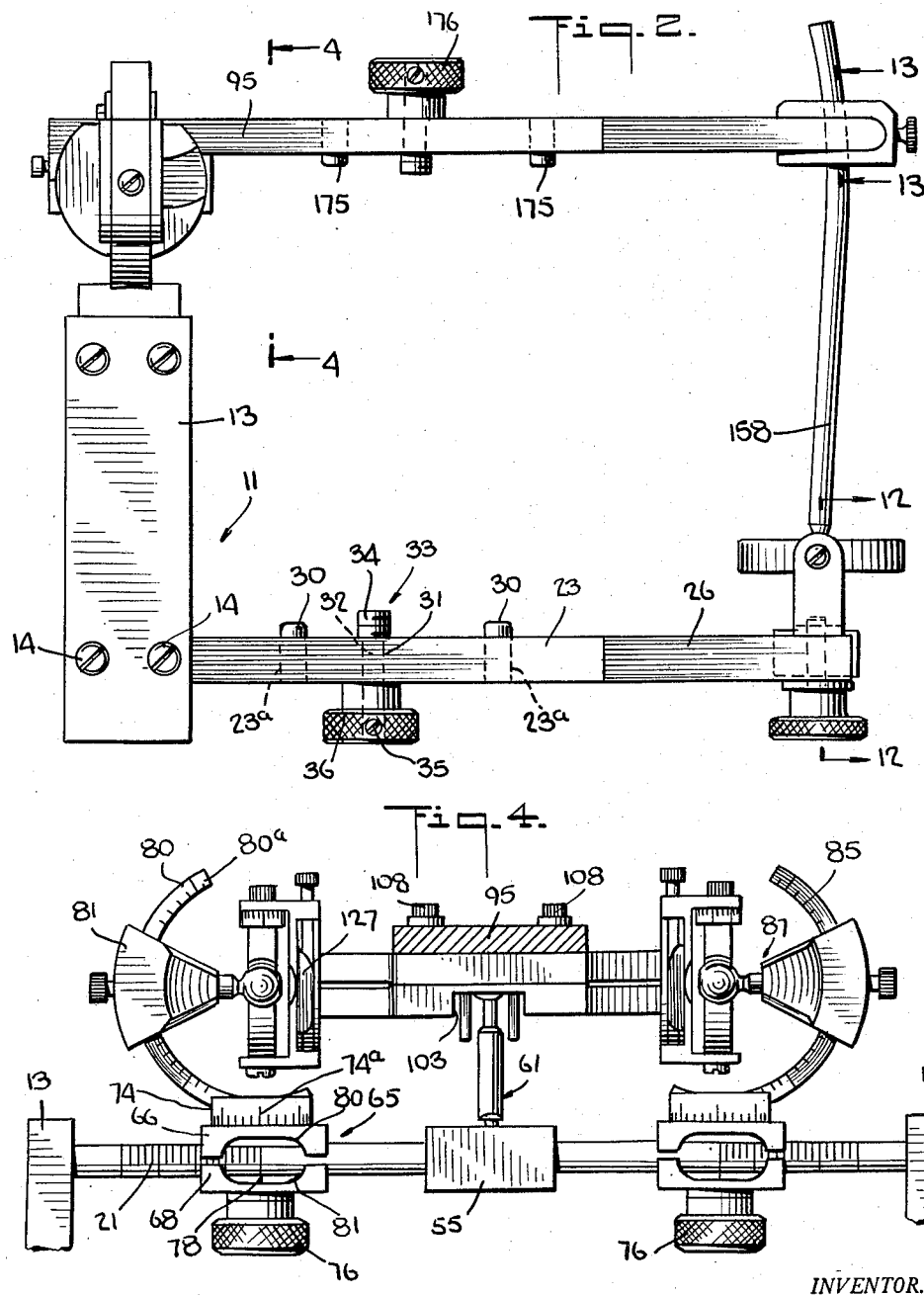

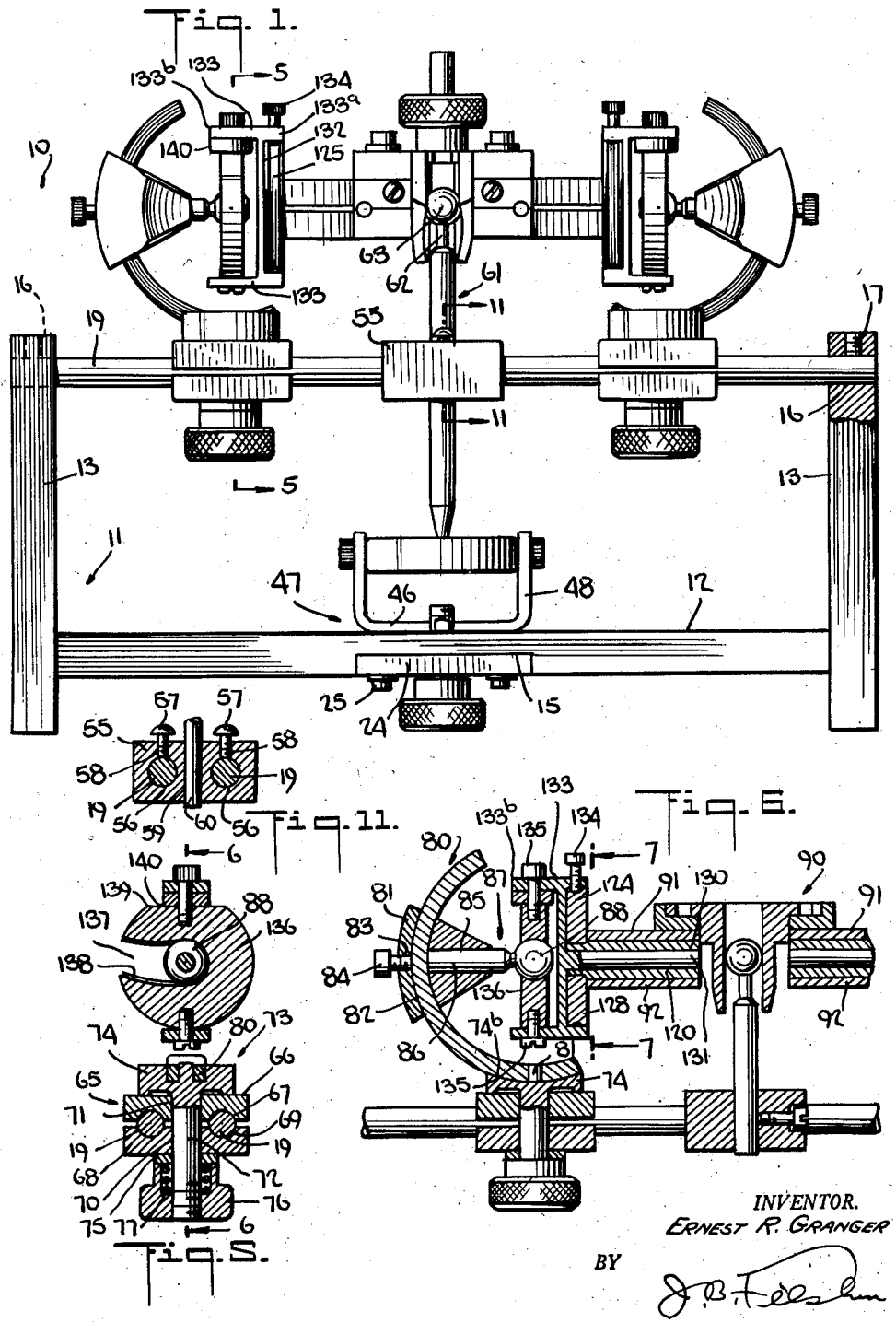

2,824,371

GNATHOLATORS

Ernest R. Granger, Mount Vernon, N. Y.

Application July 20, 1956, Serial No. 599,135

17 Claims. (Cl. 32—32)

This invention relates to gnatholators. It is particularly directed to a machine to simulate by mechanical means, movements of the lower jaw, in order to reproduce the relations of the teeth as they will function in the human mouth.

There are no two beings who function exactly the same in mouth movements. The purpose of the machine forming the subject matter of the present invention is to aid in orthodontic and prosthetic correction of mouth deformities. One of the uses thereof is to aid in molding casts in the same functional relation that the teeth in the mouth occupy with respect to its functional movements.

The device embodying the invention is adjustable to reproduce in precise detail the three dimensional paths of motion which by their combination determine the occlusal relations of the teeth.

An object of the invention is to provide a machine which will simulate the frontal movements as well as the saggital movements of the mandible. The mandible rotates and slides simultaneously at different angles at both sides. At each side of the mandible there are movements from side to side, from front to rear and up and down, and there is rotation of the mandible in each position. The machine embodying the invention is meant to simulate these movements and the machine is adjustable to provide for different degrees of movements.

A further object of this invention is to provide a strong, rugged and durable device of the character described, which shall be relatively inexpensive to manufacture, easy to adjust, and which shall yet be accurate, practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the appended claims.

In the accompanying drawings in which is shown various illustrative embodiments of this invention;

Fig. 1 is an elevational view of a machine embodying the invention;

Fig. 2 is a side elevational view thereof;

Fig. 3 is a top plan view of the machine;

Fig. 4 is a cross-sectional view taken on line 4—4 of Fig. 2;

Fig. 5 is a cross-sectional view taken on line 5—5 of Fig. 1;

Fig. 6 is a cross-sectional view taken on line 6—6 of Fig. 5;

Fig. 7 is a cross-sectional view taken on line 7—7 of Fig. 6;

Fig. 8 is a cross-sectional view taken on line 8—8 of Fig. 3;

Fig. 9 is a cross-sectional view taken on line 9—9 of Fig. 3;

Fig. 10 is a perspective view of a detail of one of the parts shown in Fig. 9;

Fig. 11 is a cross-sectional view taken on line 11—11 of Fig. 1;

Fig. 12 is a cross-sectional view taken on line 12—12 of Fig. 2;

Fig. 13 is a cross-sectional view taken on line 13—13 of Fig. 2; and

Fig. 14 is a perspective exploded view of the support for the incisal pin.

Referring now in detail to the drawing, 10 designates a machine or a device embodying the invention. The same comprises a stand or support 11. Said stand 11 comprises a horizontal cross bar 12 to the ends of which are attached a pair of vertical posts 13, as by screws 14. The bar 12 is formed at the underside thereof with a central groove 15 extending from front to rear. The vertical posts 13 are formed adjacent the upper ends thereof with horizontally aligned pairs of through openings 16 and with vertical screw threaded openings 17 extending from the upper ends of the posts down to said through openings. Supported by the posts 13 are a pair of horizontally aligned parallel transverse rods 19, the ends whereof are received in said openings 16. Set screws 20 screwed to the threaded openings 17 engage the ends of the rods 19 and serve to hold them in fixed position. The front rods 19 are formed adjacent the ends thereof with scales 21 for the purpose hereinafter appearing.

Fixed to the center of the cross bar 12 and extending forwardly therefrom is a fixed bar 23. Said bar 23 has a reduced portion 24 at its rear end received within the groove 15 of the bar 12. The portion 24 is attached to the center of the bar 12 by means of screws or other fastening members 25. Said bar 23 has a tapered forward end 26 formed with a rearwardly extending notch 27. On opposite sides of the notch 27 are bifurcated portions 28 and 29 (see Fig. 14).

The bar 23 is provided with a pair of spaced openings 23a to receive pins 30 projecting above said bar. The bar 23 is also formed with a through opening 31 between the opening 23a. Extending through the openings 31 is the shank 32 for pin 33 having an externally screw threaded head or upper end 34. The shank 32 projects below the bar 23 and fixed thereto, as by set screw 35, is a thumb wheel 36. The purpose of member 33 is for mounting plates thereon.

Slidably received within slot 27 is a block 40 formed with a screw threaded opening 41. Screwed therethrough is a threaded shank 42 to the lower end of which is fixed a thumb wheel 43 contacting the underside of bar 23. The upper end of the block 40 is formed with a transverse slot 45. Force-fitted into the cross slot 45 is the web 46 of a U-shaped member 47. Said web rests on top of b r 33. The center of web 46 has a threaded opening 41a registering with opening 41 and receiving the upper end of screw threaded shank 42. Member 47 has upwardly extending vertical arms 48 formed with horizontally aligned screw threaded through openings 49. Screwed therein on opposite sides, are headed screws 50. The shanks of the screws 49 are screwed into threaded openings 51 of a circular incisal table 52. Said incisal table is formed with a shallow conical concave surface 53 at its upper side. It will be noted that when the screw 43 is tightened, the block 40 together with members 47 and 52 are fixed to the front end of the bar 23. When the screw 43 is loosened, members 42, 40, 47 and 52 may be removed as a unit.

Mounted on the center of the cross rods 19 is a block 55 formed with horizontal through openings 56 through which said rods pass. The block 55 may be fixed to the centers of the rods 19 by means of set screws 57 passing through screw threaded openings 58 on said block. The block 55 is formed with a central vertical through opening 59. Received therein is the lower end 60 of a vertical post 61. Said post is formed with a reduced neck 62 at the upper end of which is a ball head 63.

Slidably mounted on the rods 19, on opposite sides of the center block are a pair of similar, symmetrically disposed clamps 65. Each clamp 65 comprises a top clamp member 66 formed with a pair of parallel, longitudinal, substantially half-round grooves 67 on its underside, resting on the rods 19. Each clamp 65 further comprises a bottom clamp member 68 having at its upper side substantially half-round, longitudinal, parallel grooves 69, likewise engaging the rods 19. Each lower clamp member 68 is formed with a through opening 70 and each upper clamp member 66 is formed with an aligned through opening 71. Extending through the aligned openings 70, 71, is the shank 72 of an attaching member 73. Member 73 is formed with a cylindrical head 74 at its upper end resting on top of a clamp member 66. Received on the shank 72 and engaging the underside of clamp member 68 is a washer 76. Screwed to the lower end of each shank 72 is a thumb wheel 76. Between washer 75 and the bottom of a countersunk opening in the thumb wheel 76 is a coil compression spring 77 surrounding shank 72.

It will now be understood that when each thumb wheel 76 is tightened, the clamp 65 will be clamped to the rods 19 and when said thumb screw is loosened, said clamp may be slidably moved to desired adjusted position on the rods 19.

The front edges of each of the upper and lower clamp members 66, 68 are formed with opposed notches 80 and 81 exposing a portion of the scale 21. The lower clamp member 68 may be formed with a marker 78 which may be registered with any desired position with respect to the scale 21.

Each head 74 is formed at its outer surface with a scale 74a to indicate the angular position of said head. Each head 74 is furthermore formed in its upper side with a transverse curved slot 74b (see Fig. 6). Received within the slot 74b is the lower end of a part circular or segmental bar 80 having a horizontal axis. The horizontal axes of member 80 are parallel to each other and perpendicular to support bars 19. A pin 81 extending upwardly from the head 74 is force fitted into a corresponding opening for fixing said bar to said head. Each member 80 is substantially 180° in angular extent, as shown in Fig. 6.

It will be noted that member 80 together with member 73 may be rotated about the vertical axis of the shank 72, and its angular position may be determined by readings on scale 74a. Slidably mounted on each member 80 is a segmental slider member 81 formed with an arcuate slot 82 through which member 80 passes. Each slider 81 is provided at its outer side with a through screw threaded opening 83 receiving a set screw 84 for fixing member 81 to member 80 in any desired angular position. Member 81 is formed with a radial through opening 85. Slidably received within opening 85 is the shank 86 of a pin 87. Said pin 87 is formed at its inner end with a ball head 88. It will be noted that pin 87 may be moved freely longitudinally in and out relative to the opening 85.

Supported on and between the two ball heads 87 is an assembly or device 90. The assembly 90 comprises an upper plate 91 and a lower plate 92. Fixed to the top and bottom plates 91 and 92 by screws 94 is a top bar 95. Said top and bottom plates 91 and 92 and the top bar 95 are formed with registering slots 96 having part arcuate portions 97 extending to a neck or through portion 98. The top and bottom plates 91, 92 are formed on opposite sides of the part circular portion 97 with longitudinal opposed V-shaped grooves 99 and 100. At the ends thereof, the underside of plate 91 is cut away to form a space 102 between said top and bottom plates. The underside of the bottom plate 92 is formed with a central notch 103, as shown in Fig. 4. The top bar 95 is formed with an annular track or recess 105 surrounding the circular opening 97. The recess forms a part circular bottom wall 106. In each surface 106 is a screw threaded opening 107 to receive the shank of a set screw 108.

Mounted on the recess surface 106 are a pair of similar symmetrically disposed segmental guide or contact members 110, each of which is shown in Figs. 9 and 12. Each member 110 has a top flange 111 resting on surface 106 and formed with a curved slot 111a through which the shank of the screw 108 passes. Thus, when the screw 108 is loosened, member 110 may be rotated relative to the axis of the recess 105. Member 110 has a portion 112 having an outer part cylindrical surface 113 contacting the inner surfaces 97 of bar 95 and plate 91. Extending down from portion 112 is a portion 114 which may project below the underside of plate 92. Members 110 may be adjusted angularly and contact the ball 63 on the post 61. The inner surfaces of walls 114 form an angle. Said walls 114 are straight in a vertical direction, but their rear ends may be curved inwardly as at 115.

Received on each end of the plates 91 and 92 and therebetween, is a square shank 120 engaging within the opposed notches 99 and 100. The outer ends of the plates 91 and 92 may be clamped together by vertical screws 121 to firmly grip the square shanks 120.

At the outer end of each shank 120 and contacting the outer ends of plates 91 and 92 is a circular disc 124 formed with an annular outer groove 125. A portion of the outer side of each disc 124 is beveled away or notched as at 127 to the groove 125. Each disc 124 has an inner surface 128 formed at its top with a scale 129. Each square shank 120 is formed with a longitudinal axial through opening 130. Slidable and rotatable in each through opening 130 is a shaft or stem 131. Fixed to the outer end of each stem 131 is a transverse bar 132, formed at the ends thereof with parallel horizontal arms 133. Arms 133 extend to opposite sides of the bar 132. Screwed to the portion 133a on one of the bars 133 and at the inner side of the bar 132 is a set screw 134. The disc or wheel 124 is received between the extending portions 133a of arms 133, and the inner end of the set screw 134 projects into annular groove 125. Screwed to the portions 133b of the cross arms 133 which project outwardly, are screws 135. The inner ends of each pair of opposed screws 135 are screwed to a disc 136. Disc 136 is formed with an arcuate transverse slot 137 extending to and surrounding the center of the disc. The edges of slot 137 is formed with a part circular groove 138 in transverse cross section to receive the ball 88. The top of the disc 136 may be flattened, as at 139 and a washer 140 may be interposed between the top portion 133b and the disc.

The front end of the top bar 95 is formed with a longitudinal slot 95a forming bifurcated portions or arms 95b on opposite sides of said slot. One of the arms 95b is formed with a transverse screw threaded opening 150 to which is screwed the shank of a screw 151. Slidably mounted on the front end of the bar 95 is a member 153. Said member 153 is generally of U-shape and has a top wall 154, a bottom wall 155 and a front wall 156. The top and bottom walls are formed with registering openings 157 and extending through said openings is the upper curved end 161 of an incisal pin 158. Screwed through the portion 156 of member 153 is a set screw 160 for fixing the incisal pin 158 to member 153 in adjusted position. The upper end 161 of pin 158 is arcuate and has its center of curvature at the ball 63. The rear side of the upper end 161 may be flattened and provided with a scale 163. The top and bottom walls 154, 155, overlap the top and bottom surfaces of bifurcated arms 95b. The sides of the rear portion 156 are recessed, as at 170 to receive the rear ends of said arms 95b. Member 153 is held in place on the front end of the bar 95 by means of the set screw 151. The upper bar 95 is formed with a pair of downwardly extending pins 175 and with a central screw 176 to hold an upper plate.

The Bennett movement or frontal movements of the mandible is simulated on the machine by adjustment of members 80 about the vertical axes of member 73, and by adjustment of the angle of sliders 81 on said members 80. To achieve such adjustment accurately, scales 80a are marked on the front sides of members 80. The degree of movement is controlled by adjustment of the angle of contact members 110 against the ball 63. The position of said members 110 may be read on scales 110a marked on the bottom surfaces 106 of the recesses 105. The pins 86 slide in the slider member 81 to shift the location of the balls 86 which in turn shift the axes of said balls to reproduce the Bennett or frontal movements of the mandible.

The angle of the condyle path represented by the slot 137 in disc 136 is controlled by rotation of part 133 on the axis of pin or shaft 131 which rotates within the square shaft 120. The discs 136 can also be adjusted about axes perpendicular to the shafts 131 or about the axis of the screws 135 to simulate side movement of the mandible.

The clamps 65 may have sliding adjustments on the rods 19 to permit adjustment of inter-condylar distances. Members 133 are likewise adjustable by sliding the square shafts 120 in the square holes 99 and 100 to maintain the centering axis of discs 136 on the axes of members 80. The angles of members 110 are adjustable to engage the ball 63 to control slide of pins 86 in members 81. The incisal table can rotate about a horizontal axis to control the path of travel of the incisal pin 158. The length of the pin 158 is adjustable by means of clamp 153 on the annular portion 161 of said pin.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A gnatholator comprising a stand, a horizontal support on a stand, a pair of clamp members mounted on said support, means to clamp said clamp members to said support in adjusted positions, a part circular member, having a horizontal axis, mounted on each clamp member for rotation about a vertical axis, a slider slidably mounted on each part circular member, a pin slidable radially on each slider and having a ball at its inner end, a post fixed to said support between said clamp members, and having a ball at its upper end, a device having means engaging the ball on the post, a pair of members slidably mounted on said device, and each supporting a disc formed with a longitudinally curved slot of transverse curved cross-section engaging a ball on one of the sliding pins.

2. The combination of claim 1, a bar fixed to said device and extending forwardly therefrom, said stand including a fixed bar, an incisal table mounted on the last mentioned bar, and an incisal pin mounted on the first mentioned bar for engagement with the incisal table.

3. A gnatholator comprising a horizontal support, a pair of clamps slidably mounted on said support, a curved, part-circular track member mounted on each clamp for rotation about a vertical axis, a slider slidably mounted on each part circular track member, a radial pin slidably mounted on each slider and having a head at its inner end, a post fixed on a support and between said clamps, a device, means on said device engaging said post and a pair of members on said device formed with longitudinally curved slots engaging the heads of said pins.

4. The combination of claim 3, an incisal table pivotally mounted on said support, and an incisal pin mounted on said device and engageable with the incisal table.

5. A gnatholator comprising a horizontal support, a pair of clamp members slidably mounted on said support, means to fix said clamp members to said support in various adjusted positions, a part circular member mounted for rotation on each clamp member about a vertical axis, a slider slidably mounted on each part circular member, a radial pin slidably mounted on each slider and having a head at its inner end, a device having a circular track, a pair of contact members slidably mounted on said circular track, a post fixed to said support, between said clamp members and having a head engageable by said contact members, and a pair of discs mounted on said device and having longitudinally curved slots, the edges of said slots being grooved and engaging the heads of said pins.

6. The combination of claim 5, in combination with means to adjust said discs horizontally outwardly or toward each other.

7. The combination of claim 6, and means to adjust said discs angularly about a horizontal axis.

8. The combination of claim 7, and means to adjust said discs about axes perpendicular to said horizontal axis.

9. The combination of claim 8, an incisal table mounted on said support, and an incisal pin mounted on said device and engaging with said incisal table.

10. The combination of claim 9, said incisal pin having a curved portion, the center of curvature of which is along said horizontal axis, and said incisal pin being adjustable along its curved portion, and means to clamp the incisal pin to said device in various adjusted positions.

11. A gnatholator comprising a support, a pair of part circular members, having horizontal axes, said members being mounted on said support, a slider mounted on each of said part circular members, a radial pin slidably mounted on each slider, and a device having members formed with curved slots with the edges of said slots grooved, and heads on said pins engaging the grooves in the edges of said slots.

12. The combination of claim 11, and means for adjusting said slotted members angularly about a horizontal axis and about axes perpendicular to said horizontal axis.

13. The combination of claim 12, a post fixed to said support, and a pair of contact members adjustable about a circular track on said device and adapted to engage opposite sides of said post.

14. The combination of claim 13, and a pin having a curved portion with a center of curvature on said horizontal axis, slidably mounted through an opening in said device, and means for fixing said last mentioned pin to said device in adjusted position.

15. A gnatholator comprising a stand, a horizontal support on the stand, a pair of clamps slidably mounted on said horizontal support, means to clamp said clamps to said horizontal support in various adjusted positions, a member having a part circular portion, having a horizontal axis, said member being mounted for rotation on each clamp about a vertical axis, means to fix each part circular member to its clamp in various positions angularly adjusted about a vertical axis, a slider slidably mounted on each part circular member and having a curved slot through which said part circular member passes, means to fix each slider to its part circular member in various adjusted positions, a radial pin slidably mounted in each part circular member and having a ball head at its inner end, and a device having a central circular track, a pair of contact members angularly adjusted in said circular track, means to fix said angularly adjustable members in adjusted position, a post fixed to said support and having a ball head at its upper end contacting said angularly adjusted members, said device having a pair of aligned openings of noncircular cross-section extending in opposite directions, shanks within said aligned openings and adapted to be fixed to said device in various adjusted positions, said shanks being formed with aligned circular through openings, a disc fixed to the outer end of each shank and formed with a circular peripheral groove, a shaft slidably and rotatably mounted through an opening in each shank, a member fixed to each shaft, a set screw thereon engaging the groove in the disc, and a plate on each member mounted for rotation about an axis perpendicular to the shaft and formed with a transverse curved slot, the opposite edges of the slot being of curved cross-section and engaging the ball head on one of said sliding pins.

16. The combination of claim 15, a member clamped to said stand, and an incisal table pivoted on said last member.

17. The combination of claim 16, a clamp mounted on said device and formed with a through opening, and an incisal pin passing through said through opening, and means to fix said incisal pin in various adjusted positions.

References Cited in the file of this patent

UNITED STATES PATENTS 1,586,739   Hanau _____ June 1, 1926